US006808555B2

United States Patent
Wang et al.

(10) Patent No.: US 6,808,555 B2
(45) Date of Patent: Oct. 26, 2004

(54) LIGHTFADE-STABLE INK FORMULATIONS BASED ON BLENDS OF RHODAMINES AND METAL-CONTAINING DYES

(75) Inventors: Patricia A Wang, Salem, OR (US); Alexey S Kabalnov, Corvallis, OR (US)

(73) Assignee: Hewlett-Packard Development Company, L.P., Houston, TX (US)

(*) Notice: Subject to any disclaimer, the term of this patent is extended or adjusted under 35 U.S.C. 154(b) by 27 days.

(21) Appl. No.: 10/062,596

(22) Filed: Jan. 30, 2002

(65) Prior Publication Data

US 2003/0159616 A1 Aug. 28, 2003

(51) Int. Cl.⁷ .......................................... C09D 11/02
(52) U.S. Cl. ............................. 106/31.43; 106/31.51
(58) Field of Search ........................... 106/31.43, 31.51

(56) References Cited

U.S. PATENT DOCUMENTS

| 4,554,555 | A | * | 11/1985 | Aruga et al. ................ 347/96 |
| 5,888,284 | A | | 3/1999 | Engel ....................... 106/31.27 |
| 5,997,622 | A | | 12/1999 | Weber et al. ............ 106/31.48 |
| 6,001,161 | A | | 12/1999 | Evans et al. ............. 106/31.48 |
| 6,003,987 | A | | 12/1999 | Yamamoto |
| 6,106,598 | A | | 8/2000 | Iijima ...................... 106/31.27 |
| 6,183,549 | B1 | * | 2/2001 | Wight ..................... 106/31.51 |
| 6,265,554 | B1 | | 7/2001 | Lehmann et al. .......... 534/629 |
| 6,320,031 | B1 | | 11/2001 | Baettig |
| 6,521,032 | B1 | * | 2/2003 | Lehmann et al. ........ 106/31.51 |
| 2002/0011179 | A1 | * | 1/2002 | Menzel et al. ........... 106/31.51 |
| 2003/0110980 | A1 | * | 6/2003 | Thornberry et al. ..... 106/31.27 |

FOREIGN PATENT DOCUMENTS

| EP | 0767224 A2 | 4/1997 |
| EP | 0823463 A1 | 2/1998 |
| EP | 1170337 A2 | 1/2002 |

* cited by examiner

*Primary Examiner*—Helene Klemanski

(57) ABSTRACT

The present invention provides inkjet ink compositions having high chroma and lightfastness characteristics as well as methods for the making and use thereof In one aspect of the present invention, the ink composition may include a mixture of an effective amount of a rhodamine dye and an effective amount of a metalized magenta dye in an ink vehicle. In an additional aspect of the invention, and image formed using the ink composition of the present invention may achieve a chroma of at least about 57 and a lightfastness of at least about 5 years.

15 Claims, 1 Drawing Sheet

LIGHTFADE-STABLE INK FORMULATIONS BASED ON BLENDS OF RHODAMINES AND METAL-CONTAINING DYES

FIELD OF THE INVENTION

The present invention relates generally to inkjet ink compositions and methods of for making such compositions. More particularly, the present invention relates to lightfade-stable magenta inkjet ink compositions displaying both high lightfastness and chroma.

BACKGROUND OF THE INVENTION

An inkjet image is formed when a precise pattern of ink dots is ejected from a drop generating device known as a "print head" onto a printing medium. A typical inkjet print head has an array of precisely formed nozzles located on a nozzle plate and attached to an inkjet print head base. The base incorporates an array of firing chambers that receive liquid ink (colorants dissolved or dispersed in a solvent) through fluid communication with one or more ink reservoirs. Each chamber has a thin film resistor, known as "firing resistor" located opposite the nozzle so ink can collect between the firing resistor and the nozzle. In particular, each resistor element, which is typically a pad of a resistive material, measures about 35 um×35 um. The print head is held and protected by an outer packaging referred to as a print cartridge, i.e., inkjet pen.

Upon energizing of a particular resistor element, a droplet of ink is expelled through the nozzle toward the print medium. The firing of ink droplets is typically under the control of a microprocessor, which conveys signals through electrical traces to the resistor elements. Thus the formation of alphanumeric and other characters on the print medium is possible. Both the initial quality and permanence of the image produced by an ink composition when applied to a given print medium or substrate are important. Various image characteristics determine overall image quality and permanence and may be manipulated in order to achieve desired results suitable to a specific application. Thus, the image quality attributes include such features as the color vividness and saturation, grain, quality of half-toning, and correctness of the color reproduction. The color vividness can be characterized by the chroma (C*) number of the CIELAB color system, and can readily be measured by a spectrophotometer. Color vividness substantially depends upon the paper on which the image is printed. Normally, special ink-jet photo papers enhance color vividness of ink-jet inks. On the other hand, office papers pose a greater challenge in providing the color vividness required. It is quite common therefore to characterize the color vividness of a given ink set by the chroma on a plain office paper, for example, on TM HP Printing™ Paper.

On the other hand, the image permanence attributes include the stability of images to light (lightfastness), stability to humidity (humidfastness), as well as the stability to atmospheric gases and pollutants (airfastness). Out of those three attributes, lightfastness has attracted the most attention recently. Lightfade has been a well documented phenomenon for color photographs; see, for example, the monograph: Wilhelm, H. G., *The permanence and care of color photographs: traditional and digital color prints, color negatives, slides, and motion pictures*, Grinnell, Iowa, U.S.A.: Preservation Pub. Co., 1993, which is incorporated herein by reference. It is quite common to measure the lightfastness of photographs in years to failure. According to Wilhelm, the failure occurs after a specific percentage of loss in optical density. For example, for magenta, 25% loss of the green-filter optical density represents the failure. In Wilhelm's monograph, it is suggested that the average exposure of photographs indoors is equal to 450 Lux per 12 hour day, which is equivalent to 1971 klux-hour per year. Taking into account this number, one can estimate the approximate time to failure, as based on the total light exposure of the sample in luxes required to reach the failure end point.

In the art of formulation of ink-jet inks, it is well established that the dyes that produce brighter colors tend to show poor lightfastness, and vice versa, that is, dyes having better lightfastness tend to be dull. Thus, common ink-jet dyes, such as, Acid Red 52 (Magenta), Acid Blue 9 (Cyan), and Acid Yellow 23 (Yellow) provide excellent color vividness, but extremely poor lightfastness. On the other hand, dyes containing a metal in their structure (called below metallized dyes), such as Reactive Red 23 or Direct Blue 199 show low or intermediate color vividness combined with very high lightfastness. Finally, there is a group of dyes that combines intermediate lightfastness and color vividness; among those dyes one can mention, for example, azo dyes such as Reactive Red 180.

A known approach in formulation of ink-jet inks involves blending several dyes together, so that one dye in the blend provides the color vividness, while the other improves lightfastness. This approach has been described, for example, in patents U.S. Pat. No. 5,536,306 by Johnson et al., and U.S. Pat. No. 5,772,742 by Wang. Very little is known about the interaction of the dyes in the blends, in terms of the lightfastness of the blend compared to that of the individual dyes. It is known for example, that some dyes show autocatalytic fade in the presence of the other dyes; for example, M377 dye produced by Ilford, Switzerland, fades quicker in presence of copper phthalocyanines, as reported by the manufacturer. In many other cases, a moderate stabilization effect is observed; thus, the dye fade in HP 970C magenta as a primary color is faster than in the secondary colors and in the composite black on HP Premium Plus Photo Paper. These effects are considered to be minor, and as the first approximation it is believed that the lightfastness of the mixtures is additive. Thus, when a more stable dye is chosen for the blend, the lightfastness of the blend is expected to increase.

Despite the considerable efforts in optimizing the lightfastness and color vividness performances of ink-jet inks, the need remains in further improvement upon both the color vividness and lightfastness.

SUMMARY OF THE INVENTION

Accordingly, the present invention provides a magenta inkjet ink formulation that includes a mixture of an effective amount of a rhodamine magenta dye and an effective amount of a metalized magenta dye in an ink vehicle. Such an inkjet ink formulation has been found to provide superior chroma and lightfastness characteristics which are synergistic (i.e. exceed the expected performance for such a combination). In one aspect, the formulation achieves a chroma of at least about 57 on HP Printing Paper and a lightfastness of at least about 5 years on HP Premium Plus Photo Paper. In a more detailed aspect, the formulation achieves a chroma of 60 on HP Printing Paper and lightfastness of at least about 10 years on HP Premium Plus Photo Paper.

A wide variety of rhodamine dyes may be used in the present invention. However, in one aspect, the rhodamine dye may be a member selected from the group consisting essentially of Acid Red 52, Acid Red 289, Acid Red 388, and mixtures thereof. In another aspect, the rhodamine dye may be Acid Red 289. In still another aspect the rhodamine dye can be Acid Red 52. In yet another aspect, the rhodamine dye mixture can be a mixture of Acid Red 52 and Acid Red 289.

A number of metalized magenta dyes may be used in the inkjet ink formulation of the present invention. However, in one aspect, the metalized magenta dye may be a copper containing dye. In another aspect, the metalized magenta dye may be a nickel containing dye. In yet another aspect, the copper containing dye may be a member selected from the group consisting essentially of: Reactive Red 23, pacified Reactive Red 23, and mixtures thereof. In a further aspect, the copper containing dye may be pacified Reactive Red 23.

The amount of rhodamine and metalized magenta dyes used in the present invention may be any amount sufficient to achieve an inkjet ink with the increased chroma and lightfastness characteristics achieved by the present invention. However, in one aspect of the present invention, the amount of rhodamine dye, or rhodamine dye blend is sufficient to achieve an absorbance from 0.03 to 0.20 at a 1:10000 dilution as measured at the peak absorbance wavelength, which is located between 500 and 600 nm. In another aspect, the amount of metalized magenta dye is sufficient to achieve an absorbance from about 0.03 to about 0.20 at a 1:10000 dilution as measured at the peak absorbance wavelength, which is located between 500 and 600 nm.

The present invention additionally encompasses a method of making an inkjet ink formulation that achieves superior chroma and lightfastness characteristics. In one aspect, such a method includes the step of mixing an effective amount of a rhodamine dye and an effective amount of a metalized magenta dye in an ink vehicle. The specific types of each component as described herein may be used in a variety of combinations to form such an inkjet ink.

The present invention also includes a method of making an inkjet image having high lightfastness and chroma characteristics. In one aspect, the formulation achieves a chroma of at least about 57 on HP Printing Paper and a lightfastness of at least about 5 years on HP Premium Plus Photo Paper. In a more detailed aspect, the formulation achieves a chroma of about 60 on HP Printing Paper and lightfastness of at least about 10 years on HP Premium Plus Photo Paper.

There has thus been outlined, rather broadly, the more important features of the invention so that the detailed description thereof that follows may be better understood, and so that the present contribution to the art may be better appreciated. Other features of the present invention will become clearer from the following detailed description of the invention, taken with the accompanying claims, or may be learned by the practice of the invention.

DETAILED DESCRIPTION OF THE INVENTION

Definitions

Figure 1:
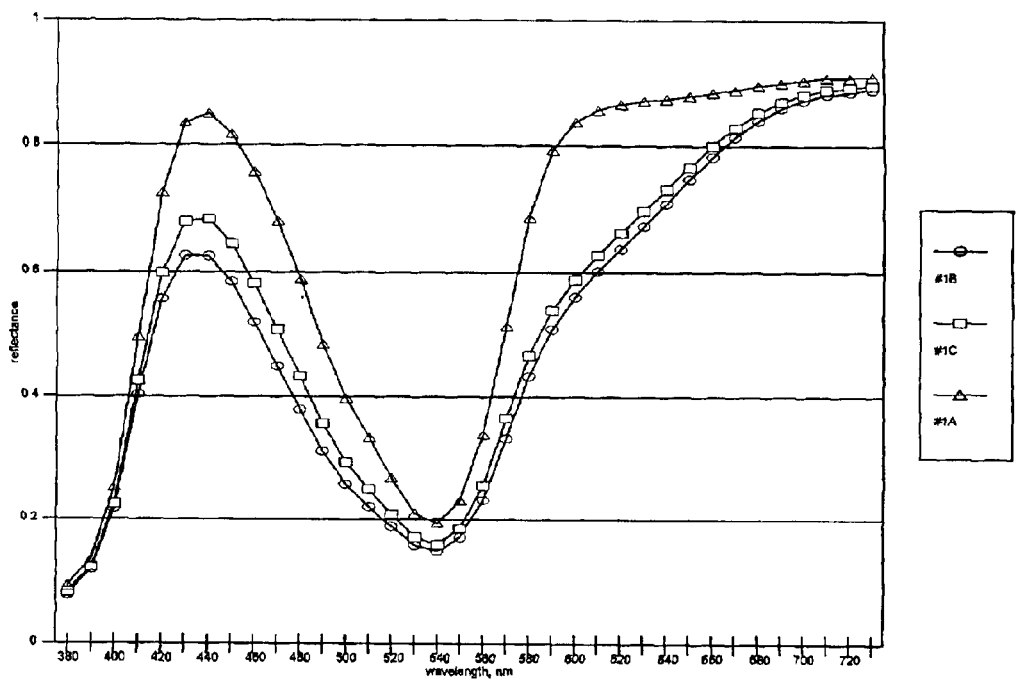
FIG. 1 is a graphical representation of the initial reflectance spectra achieved by two ink formulations based on the rhodamine dye-metallized dye blend in accordance with the present invention, as compared to the ink formulation that containing a rhodamine dye alone.

For the purposes of promoting an understanding of the principles of the invention, reference will now be made to one or more embodiments of the invention, and specific language will be used to describe the same. It will nevertheless be understood that no limitation of the scope of the invention is thereby intended. Any alterations and further modifications of the inventive features illustrated herein, and any additional applications of the principles of the invention as illustrated herein, which would occur to one skilled in the relevant art and having possession of this disclosure, are to be considered within the scope of the invention.

In describing and claiming the present invention, the following terminology will be used.

The singular forms "a," "an," and "the" include plural referents unless the context clearly dictates otherwise. Thus, for example, reference to "a dye" includes one or more dyes, reference to "an image" includes one or more different images, and reference to "the substrate" includes one or more print substrates.

The terms "formulation" and "composition" may be used interchangeably herein.

As used herein, "effective amount" refers to the minimal amount of a substance or agent, which is sufficient to achieve a desire effect. For example, an effective amount of an "ink vehicle" is the minimum amount required in order to create ink, which will meet the specified performance and characteristic standards. Additionally, the minimum amount of a "dye" or "pigment" would be the minimum amount, which can still achieve the specified performance and characteristic standards.

As used herein, "ink vehicle," refers to the vehicle in which a colorant, such as a pigment or dye is placed to form ink. Ink vehicles are well known in the art, and a wide variety of ink vehicles may be used with the ink composition of the present invention. Such ink vehicles may include a mixture of a variety of different agents, including without limitation, solvents, co-solvents, buffers, biocides, viscosity modifiers, surface-active agents (i.e. surfactants), salts, and water.

As used herein, "chroma" refers to the relative colorfulness of a given color. Chroma is known in the art as the colorfulness of an area judged in proportion to the brightness of a similarly illuminated area that appears to be white. Further, instrumentation and calculations for measuring and determining the level of chroma are well known to those skilled in the art, for example as described in *The Reproduction of Colour*, 5$^{th}$ Ed., Chap. 8., by R. W. G. Hunt, which is incorporated herein by reference.

As used herein, "lightfastness" refers to the ability of the ink-jet ink to retain its chroma and/or optical density as well as other hue properties over time of exposure to visible light.

As used herein, "optical density" refers to the fullness and intensity characteristics of an inkjet ink after application to a print medium. Optical density can be calculated as the negative log of the ratio of the light reflected off of the print media divided by the amount of light incident on the print media. Different light filters are used for measuring the optical density of different colors. Thus, cyan, magenta and yellow colors are measured through the red, green and blue filters, respectively.

As used herein, "rhodamine" refers to a dye having the general formula:

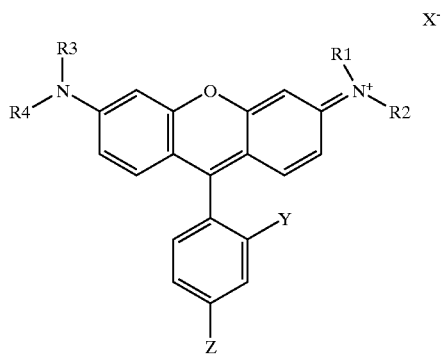

wherein R1, R2, R3, and R4 are either hydrogen, or hydrocarbon groups which may or may not contain one or more ionic groups, such as sulfonate groups, X$^-$ is a suitable counter ion to quaternized nitrogen, Y is either a hydrogen or an ionic group, such as a sulfonate or carboxy group, and Z is either a hydrogen or an ionic group, such as a sulfonate or carboxy group. Rhodamine dyes may be anionic, cationic, or zwitterionic depending on the specific combination of functional groups attached as R1–R4, Y and Z. Many rhodamine dyes are known to those skilled in the art of inkjet inks. An additional discussion and examples of rhodamine dyes is disclosed by O. Valcl, I. Nemcova, V. Suk. in the *Handbook of Triarylmethane and Xanthene Dyes*, CRC Press, Boca Raton, Fla., 1985, which is incorporated herein by reference.

As used herein, "Acid Red 52" refers to a rhodamine dye wherein R1–R4 are each $CH_2CH_3$, and Y and Z are $SO_3^-M^+$, where $M^+$ is a counter ion, such as $Na^+$, $K^+$, $Li^+$ or $NH_4^+$. This dye is also known as Sulfo Rhodamine B and is structure is shown in the As used herein, "Acid Red 52" refers to a rhodamine dye wherein R1–R4 are each $CH_2CH_3$, and Y and Z are $SO_3^-M^+$, where $M^+$ is a counter ion, such as $Na^+$, $K^+$, $Li^+$ or $NH_4^+$. This dye is also known as Sulfo Rhodamine B and is structure is shown in the handbook of M. Okawara, T. Kitao, T. Hirashima, M. Matsuoka, *Organic Colorants: A Handbook of Data for Electro-Optical Applications*, Elsevier, Amsterdam-Oxford-New York-Tokyo (1988), which is incorporated herein by reference.

As used herein, "Acid Red 289" refers to a rhodamine dye wherein R1 and R3 are hydrogen, R2 is a dimethylphenylsulfonic group, R4 is a dimethyl phenyl group, Y is $SO_3^-M^+$, where $M^+$ is a counter ion, such as $Na^+$, $K^+$, $Li^+$ or $NH_4^+$, and Z is hydrogen. This dye is produced for example by Sensient, Elmwood Park, N.J.

As used herein, "Acid Red 388" refers to a rhodamine dye wherein R1–R4 are each $CH_2CH_3$, Y and Z are $COO^-M^+$, where $M^+$ is a counter ion, such as $Na^+$, $K^+$, $Li^+$ or $NH_4^+$. This dye is produced, for example, by Crompton and Knowles Colors, Inc, Reading, Pa. under the name Rhodamine WT. The structure of Rhodamine WT can be found, for example, in the publication "Tracer Test Design Factors" of the US Environmental Protection Agency, National Center for Environmental Assessment, Oct. 25, 2000, which is incorporated herein as a reference.

It should be recognized that commercial dyes often represent a mixture of isomers and the location of some groups, for example, sulfonate and carboxy groups, can be somewhat different from the ones shown in the chemical structure above.

As used herein, a "metalized magenta dye" refers to a red, magenta, or violet dye which includes a metal ion complex. Various methods for complexing metal ions to organic chemical groups, are known to those skilled in the art, for example, by chelation. Further, a variety of metal ions may be used to create the metal ion complex, such as copper, nickel, cobalt, and iron.

As used herein, "Reactive Red 23" refers to a dye having the general formula:

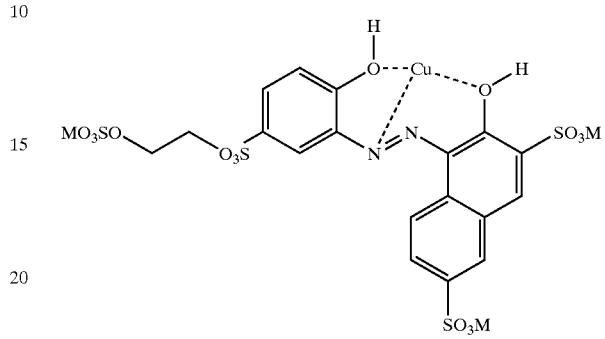

wherein M represents a positively charged monovalent counter ion, such as $Na^+$, $K^+$, $Li^+$, or $NH_4^+$.

As used herein, "pacified Reactive Red 23" refers to a pacified form of Reactive Red 23, as recited above which is pacified by removal of the terminal sulfate group as follows:

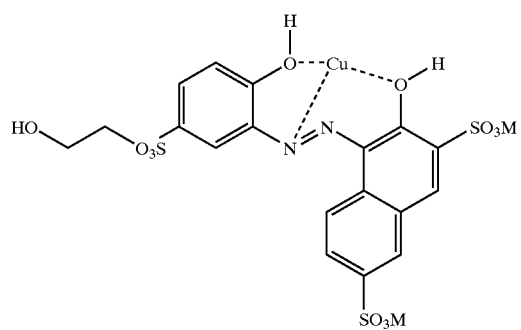

wherein M represents a positively charged monovalent counter-ion, such as $Na^+$, $K^+$, $Li^+$, or $NH_4^+$.

As used herein, "print media," "print surface," and "substrate" may be used interchangeably, and refer to a surface to which ink is applied in order to form an image.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a concentration range of "about 0.1% w/w to about 5% w/W" should be interpreted to include not only the explicitly recited concentration of about 1% to about 5% w/w, but also include individual concentrations and the sub-ranges within the indicated range. Thus, included in this numerical range are individual concentrations such as 2% w/w, 3% w/w, and 4% w/w, and sub-ranges such as from 1% w/w to 3% w/w, from 2% w/w to 4% w/w, from 3% w/w to 5% w/w, etc. This same principle applies to ranges reciting only one numerical value. Furthermore, such an interpretation should apply regardless of the breadth of the range or the characteristics being described.

All concentrations in this patent are referenced in weight percents, except for the concentrations of dyes, which are occasionally referenced as the absorbance (A) at the peak magenta wavelength at 1:10000 w/w dilution. The peak magenta wavelength is defined as the wavelength between 500 and 600 μm, at which the absorbance of the 1:10000 w/w diluted dye solution reaches the maximum. The weight concentration of the dye C and the absorbance A are related by the following equation:

$$C, wt\ \% = 10^3 (A/\epsilon)$$

where $\epsilon$ is the extinction coefficient of the dye in Liters/(g cm) at the peak wavelength. Some extinction coefficients of the dyes are shown in Table below. Extinction coefficients, Liters/(g cm) of some dyes

| Dye | Extinction coefficient (wavelength, nm) |
| --- | --- |
| Pacified Reactive Red 180 (Sensient, NJ) | 44 (541) |
| Acid Red 289 (Sensient, NJ) | 88 (528) |
| Acid Red 388 Na salt (Crompton & Knowles Colors, Inc., Reading, PA) | 122 (556) |
| Acid Red 52 Li salt (Sensient, NJ) | 125 (566) |
| Pacified Reactive Red 23, (Avecia, Wilmington, DE) | 33 (522) |

Invention

The present invention encompasses an inkjet ink formulation including a mixture of an effective amount of a rhodamine dye and an effective amount of a metalized magenta dye in an ink vehicle. It has been surprisingly found that the combination of rhodamine and metalized magenta dyes has a synergistic effect that imparts an unexpectedly high level of chroma and lightfastness to the ink. As a result, images formed with such an ink are of high quality with respect to these visual characteristics, and may be used over a wide variety of print applications. The synergistic lightfastness effects are not seen in combinations of the metalized and non-rhodamine magenta dyes, including relatively lightfast non-rhodamine dyes. Furthermore, the combinations of metallized and non-rhodamine dyes do not provide the high chroma and lightfastness of the rhodamine blends. A wide variety of specific rhodamine dyes are known for various printing applications to those skilled in the art, and may be used in the present invention.

A large number of such dyes have been cataloged by M. Okawara, T. Kitao, T. Hirashima, M. Matsuoka in their publication, *Organic Colorants: A Handbook of Data for Electro-Optical Applications*, Elsevier, Amsterdam-Oxford-New York-Tokyo (1988), which is incorporated herein by reference. Examples of suitable rhodamine dyes include without limitation Rhodamine 110 (dye cat # 54001), Rhodamine 123 (dye cat # 54002), Rhodamine 6G (dye cat # 54003, C.I. Basic Red 1), Rhodamine 6G extra (dye cat # 54004), Rhodamine 116 (dye cat # 54005), Rhodamine B (dye cat # 54006, C.I. 45170 Basic Violet 10), Tetramethylrhodamine perchlorate (dye cat # 54007), Rhodamine 3B (dye cat # 54008), Rhodamine 19 (dye cat # 54009), Sulforhodamine (dye cat # 54012). Some other rhodamine dyes are listed in Ref. 1, e.g., Acridine Red (C.I. 45000), Acid Red 52, Pyronine G (C.I. 45005), Rhodamine S (C.I. 45050, Basic Red 11), Rhodamine G (C.I. 45150, Basic Red 8), Ethylrhodamine B (C.I. 45175, Basic Violet 11), Rhodamine 4G (C.I. 45166), C.I. Acid Red 289, Rhodamine 3GO (C.I. 45215, Basic Red 4), C.I. Acid Red 388, Sulforhodamine G, and mixtures thereof.

In one aspect of the present invention, the rhodamine dye may be a member selected from the group consisting of: Acid Red 52, Acid Red 289, Acid Red 388, and mixtures thereof. In another aspect, the rhodamine dye used may be Acid Red 289. In another aspect, the rhodamine dye used may be Acid Red 52. In still another aspect, the rhodamine dye used may be an Acid Red 52-Acid Red 289 blend or mixture.

A number of metalized magenta dyes are known to those skilled in the art and may be used in the ink formulation of the present invention. In one aspect, the metalized magenta dye used may be a magenta dye containing a metal ion complex with a metal selected from the group consisting of: copper, nickel, cobalt, iron, and mixtures thereof. In another aspect, the metal may be copper. In yet another aspect, the metal may be nickel. Examples of specific metalized magenta dyes include without limitation, Reactive Red 23, pacified Reactive Red 23, as well as mixtures thereof. In a further aspect, the metalized magenta dye used may be pacified Reactive Red 23.

The amount of each dye component used in the formulation of the present invention may be adjusted to any level or ratio required in order to achieve a specifically desired result, such as a certain visual characteristic. Many visual characteristics may be measured and determined using various light reflectance and absorbance techniques known to those of ordinary skill in the art. In one aspect, the amount of rhodamine dye may be an amount sufficient to achieve an absorbance from 0.03 to 0.20 at a 1:10000 dilution as measured at the magenta peak absorbance, which is normally located between 500 and 600 nm. In another aspect, the amount of rhodamine dye included in the ink formulation may be from about 0.1% w/w to about 5% w/w of the ink formulation. In another aspect, the amount of rhodamine dye may be from about 0.3% w/w to about 2% w/w of the ink formulation. In yet another aspect, the amount of rhodamine dye may be about 1.1 to about 1.7% w/w of the ink formulation.

The same principles recited above for the amount of rhodamine dye are equally applicable to the amount of magenta metalized dye. A wide variety of amounts may be utilized by one skilled in the art in order to achieve a specific result, and the specific amount used may depend in part on the specific rhodamine or metalized magenta dye used. However, in one aspect, the amount of metalized magenta dye may be sufficient to achieve an absorbance from 0.03 to 0.20 at a 1:10000 dilution as measured at the magenta peak absorbance wavelength, which is normally located between 500 and 600 nm. In another aspect, the amount of metalized magenta dye may be from about 0.2% w/w to about 5% w/w of the ink formulation. In another aspect, the amount of metalized magenta dye may be from about 1% w/w to about 5% w/w of the ink formulation. In a further aspect of the invention, the amount of metalized magenta dye may be about 1 to about 2% w/w. In addition to the above recited amounts, the dyes of the present ink formulation may be included at any ratio of one to the other which is required to achieve a desired result.

Those of ordinary skill in the art will be able to determine the desired combination of dyes and may base such a decision in part on factors, such as the specific print application in which the ink is to be used, the specific combination of dyes, etc. However, in one aspect, the ratio of rhodamine dye to metalized magenta dye may be from about 1:10 to about 10:1 by absorbance at the peak wavelength. In another aspect, the ratio may be from about 1:5 to about 5:1 by absorbance at the peak wavelength. In yet another aspect, the ratio may be from about 1.5:1 to about 1:1.5 by absorbance at the peak wavelength. In a further aspect of the invention, the ratio may be about 1:1 by absorbance at the peak wavelength.

It is generally understood, that in a detailed implementation of this invention, both dyes carry the same overall molecular charge, or one dye or both dyes are neutral to avoid precipitation. Thus, if the metallized dye is anionic, the rhodamine dye must be either neutral or anionic. If this is not the case, standard modifications of the rhodamine structure can be made, such as introduction of the sulfonate or carboxy groups.

In addition to the above-recited mixture of rhodamine and magenta metalized dyes, the ink formulation used in the present invention includes an ink vehicle. Many well-known ink vehicle components may be used in varying amounts including without limitation, ingredients such as water, organic solvents, surface-active agents (surfactants), buffers, viscosity modifiers, biocides, surfactants, salts, and metal chelators.

Water may make up a large percentage of the overall ink vehicle of the present invention. In one aspect, the water may be deionized water in an amount of from about 51% w/w to about 90% w/w of the ink composition. Various deionization techniques and states for water are known. In one aspect, the water may be deionized at 18 Mohm.

Organic solvents, or co-solvents may be included as a component of the ink vehicle, and are generally water-soluble solvents. In one aspect, the amount of organic solvent component may be from about 5% w/w to about 49% w/w of the ink formulation. One or more solvents may be used to achieve the amount specified above. Further, when a mixture of solvents is used, the combination may be included in a variety of ratios when necessary to achieve a specific result.

Examples of suitable solvents include without limitation: lactams, such as 2-pyrrolidone, N-methyl-pyrrolid-2-one (NMP), 1,3-dimethylimidazolid-2-one, and octylpyrrolidone; diols such as ethanediols, (e.g., 1–2-ethandiol), propanediols (e.g., 1,2-propanediol, 1,3-propanediol, 2-ethyl-2-hydroxy-methyl-1,3-propanediol, ethylhydroxypropanediol), butanediols (e.g., 1,2-butanediol, 1,3-butanediol, 1,4-butanediol), pentanediols (e.g., 1,5-pentanediol), hexanediols (e.g., 1,2-hexanediol, 1,6-hexanediol, 2,5-hexanediol), heptanediols (e.g., 1,2-heptanediol, 1,7-heptanediol), octanediols (e.g., 1,2-octanediol, 1,8-octainediol); glycols, glycol ethers and thioglycol ethers, commonly employed in ink-jet inks, such as polyalkylene glycols such as polyethylene glycols (e.g., diethylene glycol (DEG), triethylene glycol, tetraethylene glycol), polypropylene glycols (e.g., dipropylene glycol, tripropylene glycol, tetrapropylene glycol), polymeric glycols (e.g., PEG 200, PEG 300, PEG 400, PPG 400), ethoxylated glycerols, and thiodiglycol.

One or more surfactant ingredients may be included in the present ink formulations. In one aspect, the surfactant ingredient may be added in an amount of up to about 5% w/w of the ink composition. In one aspect, the surfactant may be present in an amount of from about 0.01 to about 4%. In another aspect, the surfactant may be present in an amount of about 1% w/w of the ink formulation. Such amounts may be achieved using a single surfactant ingredient, or a mixture of surfactant ingredients.

Generally, surfactants are used in order to increase the penetration of the ink into the print medium. A wide variety of surfactant classes may be used including without limitation, cationic, anionic, zwitterionic or non-ionic surfactants. One example of nonionic surfactants is secondary alcohol ethoxylates. Such compounds are commercially available, for example, Tergitol, Silwet, Surfynol, and Dowfax series, such as TERGITOL 15-S-5, TERGITOL 15-S-7 (Dow Chemical Co.), SILWET L77 (Witco Chemicals), SURFYNOL 104E, SURFYNOL CT 111, SURFYNOL 440 (Air Products And Chemicals, Inc.), and DOWFAX 8390 (Dow Chemical Co.).

The ink vehicle of the present ink composition may optionally include up to about 5% w/w of a biocide. In one aspect, the biocide may be present in an amount of up to about 1 percent by weight of the ink composition. In a further aspect, the biocide may be present in an amount of up to 0.2% w/w of the ink composition. Such amounts may be the result of a single biocide ingredient, or a mixture of two or more biocides.

Any of the biocides commonly employed in inkjet inks, and known to those skilled in the art may be used in the practice of the present invention, such as NUOSEPT 95, available from Huls America (Piscataway, N.J.); PROXEL GXL, available from Avecia (Wilmington, Del.); and glutaraldehyde, available from Dow Chemical Company under the trade designation UCARCIDE 250. In one aspect, the biocide is PROXEL GXL.

In addition to the above-recited ingredients, the present inkjet ink composition may include a buffer agent. In one aspect, the buffer agent may be present in an amount of up to about 5 percent by weight of the ink composition. In another aspect, the buffer may be present in an amount of up to about 1% w/w of the ink composition. These amounts may be achieved using a single buffer agent, or a combination of buffer agents.

The buffers in the ink vehicle are primarily used to modulate pH. Such buffers can be organic-based biological buffers, or inorganic buffers. The specific type and amount of buffer may be readily selected by one of ordinary skill in the art in order to achieve a specific result. Examples of specific buffers which may be used include without limitation, Trizma Base, 4-morpholineethanesulfonic acid (MES), and 4-morpholinepropanesulfonic acid (MOPS), all available from Aldrich Chemical (Milwaukee, Wis.).

Metal chelator agents may be included in the ink vehicle of the present ink composition. In one aspect, the metal chelator may be present in an amount of up to about 2% w/w of the ink composition. In another aspect, the metal chelator may be present in an amount of up to about 1% w/w of the ink composition. In a further aspect, the metal chelator may be present in an amount of up to about 0.1% w/w of the ink composition. In yet another aspect, the metal chelator may be present in an amount of up to about 0.01% w/w of the ink composition. One or more metal chelators may be used to achieve these amounts.

A variety of metal chelators may be used in connection with the present invention as will be recognized by those skilled in the art. Examples of suitable metal chelators include without limitation, ethylenediaminetetraacetic acid (EDTA), diethylenetriaminepentaacetic acid, trans-1,1,2-diaminocyclohexanetetraacetic acid, (ethylenedioxy) diethylenedinitrilotetraacetic acid, and other chelators that bind transition metal cations. In one aspect, the metal chelator is EDTA.

The present invention additionally encompasses a method of making the ink formulations of the present invention. A variety of methods known to those skilled in the art may be used to make the present ink formulations. However, in one aspect of the invention, such a method includes the step of mixing an effective amount of a rhodamine dye and an effective amount of a metalized magenta dye in an ink vehicle.

Further, the present invention includes a method of making an inkjet image having a chroma of at least about 57 on HP Printing Paper and a lightfastness of at least about 5 years on HP Premium Plus Photo Paper. In one aspect, such a method includes the steps of providing an inkjet ink as described herein; and applying the inkjet ink to a print media using an inkjet pen. As is evident, any of the rhodamine and metalized magenta dyes as described herein may be used in such a method. Further, the amount and type of each, as well as the specific components of the ink vehicle may be specifically selected in order to vary the amount of chroma or lightfastness achieved to a value greater than the above recited values.

The example provided below is merely illustrative of various specific embodiments for the ink compositions and methods in accordance with present invention disclosed herein, and no limitation is intended thereby.

EXAMPLE 1

Acid Red 289—Pacified Reactive Red 23 Blends

Three ink formulations are prepared having the following compositions:

TABLE 1

Formulation #1A

| Ingredient | Wt % |
|---|---|
| Trimethylolpropane (Aldrich) | 7.5 |
| 2-pyrrolidinone (Aldrich) | 7.5 |
| Alkyl Diol | 8 |
| Secondary alcohol ethoxylate | 2 |
| Buffer | 0.2 |
| Chelating Agent | 0.2 |
| Acid Red 289 Na salt | 1.7 |
| Water to | 100 |

TABLE 2

Formulation #1B

| Ingredient | Wt % |
|---|---|
| Trimethylolpropane (Aldrich) | 7.5 |
| 2-pyrrolidinone (Aldrich) | 7.5 |
| Alkyl Diol | 8 |
| Secondary alcohol ethoxylate | 2 |
| Buffer | 0.2 |
| Chelating Agent | 0.2 |
| Acid Red 289 Na salt | 1.7 |
| Pacified Reactive red 23 Na salt | 1.8 |
| Water to | 100 |

TABLE 3

Formulation #1C

| Ingredient | Wt % |
|---|---|
| Trimethylolpropane (Aldrich) | 7.5 |
| 2-pyrrolidinone (Aldrich) | 7.5 |
| Alkyl Diol | 8 |
| Secondary alcohol ethoxylate | 2 |
| Buffer | 0.2 |
| Chelating Agent | 0.2 |
| Acid Red 289 | 1.7 |
| Pacified Reactive red 23 Na salt | 1.2 |
| Water to | 100 |

Notably, all of the inks have identical ink vehicles and the same amount and type of rhodamine dye. However, the #1B and #1C ink formulations have different amounts of copper stabilized dye, pacified Reactive Red 23, while #1A ink has none.

Each of the inks were filled into HP C6578D color pens and tested in a HP 970Cxi printer and evaluated for lightfastness properties using HP Colorfast Paper (part number C7013A) and HP Premium Plus Paper (part number C6944A). The green filter optical density of the each test print was 0.5 and the failure criterion was 25% optical density loss, according to Wilhelm failure criteria. The samples were faded using a cool-white bare-bulb light source at the light intensity of 70 klux, and the images were not protected by glass. The time-to-failure in years, as based on the estimated 1971 klux hour exposure per year, are shown in Table 4 below.

TABLE 4

Lightfastness of AR 289-pRR23 blends

| Ink Formulation | Lightfastness, years, on HP Colorfast paper | Lightfastness, years, on HP Premium Plus paper | Chroma, HP Printing Paper |
|---|---|---|---|
| #1A | 2.4 | 2.1 | 71 |
| #1B | 8.3 | 7.3 | 57 |
| #1C | 6.0 | 5.7 | 58 |

As can be seen, the addition of the magenta metal dye to the rhodamine dye improves the lightfastness of the ink formulations by about three fold.

EXAMPLE 2

Acid Red 388—Pacified Reactive Red 23 Blends

TABLE 5

Formulation #2A

| Ingredient | Wt % |
|---|---|
| Trimethylolpropane (Aldrich) | 7.5 |
| 2-pyrrolidinone (Aldrich) | 7.5 |
| Alkyl Diol | 8 |
| Secondary alcohol ethoxylate | 2 |
| Buffer | 0.2 |
| Chelating Agent | 0.2 |
| Acid Red 388 Na salt | 1.2 |
| Water to | 100 |

TABLE 6

Formulation #2B

| Ingredient | Wt % |
|---|---|
| Trimethylolpropane (Aldrich) | 7.5 |
| 2-pyrrolidinone (Aldrich) | 7.5 |
| Alkyl Diol | 8 |
| Secondary alcohol ethoxylate | 1 |
| Buffer | 0.2 |
| Chelating Agent | 0.2 |
| Acid Red 388 Na salt | 1.2 |
| Pacified Reactive red 23 Na salt | 1.8 |
| Water to | 100 |

TABLE 7

Formulation #2C

| Ingredient | Wt % |
|---|---|
| Trimethylolpropane (Aldrich) | 7.5 |
| 2-pyrrolidinone (Aldrich) | 7.5 |
| Alkyl Diol | 8 |
| Secondary alcohol ethoxylate | 1 |
| Buffer | 0.2 |
| Chelating Agent | 0.2 |
| Pacified Reactive red 23 Na salt | 1.8 |
| Water to | 100 |

All the inks have identical ink vehicles. However, the #2A ink contains only the rhodamine dye, the #2C only pacified Reactive Red 23, and the #2B contains the mixture of the two. Each of the inks were filled into HP C6578D color pens and tested as described in Example 1. The lightfastness performance results are shown in Table 8 below.

TABLE 8

Lightfastness of AR 388-pRR23 blends.

| Ink Formulation | Lightfastness, years, on HP Colorfast paper | Lightfastness, years, on HP Premium Plus paper | Chroma, HP Printing Paper |
|---|---|---|---|
| #2A | 0.3 | 0.3 | 76 |
| #2B | 13.0 | 7.4 | 58 |
| #2C | 18.2 | 11.6 | 49 |

As can be seen, the addition of the magenta metal dye to the rhodamine dye improves the lightfastness of the ink formulations by tenfold, and makes it similar to the one of the 15 metallized dye alone. Chroma of the blends, however, is much improved over that of the metalized dye alone.

EXAMPLE 3

Acid Red 52—Pacified Reactive Red 23 Blends

Three ink formulations were prepared having the following compositions:

TABLE 9

Formulation #3A

| Ingredient | Wt % |
|---|---|
| Trimethylolpropane (Aldrich) | 7.5 |
| 2-pyrrolidinone (Aldrich) | 6.5 |
| Alkyl Diol | 8 |
| Secondary alcohol ethoxylates | 2 |
| Sodium hexadecyl dipheyloxide disulfonate | 0.4 |
| Magnesium Nitrate Hexahydrate (Aldrich) | 6 |
| Ammonium Nitrate | 1 |
| Buffer | 0.2 |
| Chelating Agent | 0.2 |
| Acid Red 52 Li salt | 1.1 |
| Water to | 100 |

TABLE 10

Formulation #3B

| Ingredient | Wt % |
|---|---|
| Trimethylolpropane (Aldrich) | 7.5 |
| 2-pyrrolidinone (Aldrich) | 7.5 |
| Alkyl Diol | 8 |
| Buffer | 0.2 |
| Secondary alcohol ethoxylates | 2 |
| Sodium hexadecyl dipheyloxide disulfonate | 0.4 |
| Magnesium Nitrate Hexahydrate (Aldrich) | 6 |
| Ammonium Nitrate | 1 |
| Chelating Agent | 0.2 |
| Acid Red 52 Li salt | 1.1 |
| Pacified Reactive red 23 Na Salt, | 1.8 |
| Water to | 100 |

TABLE 11

Formulation #3C

| Ingredient | Wt % |
|---|---|
| Trimethylolpropane (Aldrich) | 7.5 |
| 2-pyrrolidinone (Aldrich) | 7.5 |
| Alkyl Diol | 8 |
| Buffer | 0.2 |
| Secondary alcohol ethoxylates | 2 |
| Sodium hexadecyl dipheyloxide disulfonate | 0.4 |
| Magnesium Nitrate Hexahydrate (Aldrich) | 6 |
| Ammonium Nitrate | 1 |
| Chelating Agent | 0.2 |
| Pacified Reactive red 23 Na Salt, | 1.8 |
| Water to | 100 |

All of the inks have identical ink vehicles. However, the #3A contained only the 5 rhodamine dye, #3C only pacified Reactive Red 23, and #3B contained the mixture of the two. Each of the inks were filled into HP C6578D color pens and tested in a HP 970Cxi printer as described in Example 1. The lightfastness performance are shown in Table 12 below.

TABLE 12

Lightfastness of AR 52-pRR23 blends.

| Ink Formulation | Lightfastness, years, on HP Colorfast paper | Chroma, HP Printing Paper |
|---|---|---|
| #3A | 1 | 76 |
| #3B | 39 | 57 |
| #3C | 73 | 49 |

One can see a substantial (x30) improvement in the lightfastness of the blend, compared to the lightfastness of AR52 dye alone.

EXAMPLE 4

Comparison of Lightfastness and Plain Paper Chromas of a Variety of Printing Systems An azo magenta dye, that is, Reactive Red 180 (Sensient, N.J.), was tested by itself, as well as the blends with pacified Reactive Red 23. All the inks had the vehicle described in Example 3. The concentrations of the dyes in the ink vehicle are indicated in Tables 13 and 14 as the value of absorbance at 1:10000 dilution at the peak wavelength in magenta region, between 500 and 600 nm.

TABLE 13

Lightfastness and plain paper chroma of various individual magenta, azo, and metalized dyes.

| Dye | Lightfastness, yrs, 25% loss failure criterion, OD = 0.5, HP Premium Plus Photo Paper | Lightfastness, yrs, 25% loss failure criterion, OD = 0.5, HP Colorfast Photo Paper | Plain Paper Chroma (HP Printing Paper) |
|---|---|---|---|
| Metallized dyes | | | |
| PRR23, Abs = 0.15 | 24 | 73 | 49 |
| Azo dyes | | | |
| Reactive Red 180, Abs = 0.10 | 1.6 | 2.7 | 65 |
| Rhodamine dyes | | | |
| Acid Red 388 Na (Formulation #2A) | 0.3 | 0.3 | 76 |
| Acid Red 52 Li, Abs = 0.14 | 0.3 | 1 | 76 |
| Acid Red 289 Na, Abs = 0.15 | 2.1 | 2.4 | 71 |

TABLE 14

Lightfastness and plain paper chroma of various dye blends.

| Dye 1 | Dye 2 | Lightfastness, yrs, 25% loss failure criterion, OD = 0.5, HP Premium Plus Photo Paper | Lightfastness, yrs, 25% loss failure criterion, OD = 0.5, HP Colorfast Photo Paper | Plain Paper Chroma (HP Printing Paper) |
|---|---|---|---|---|
| Blends of azo- and metallized dyes | | | | |
| PRR23, Abs = 0.10 | Reactive Red 180, Abs = 0.10 | 6.4 | 7.5 | 54 |
| Blends of rhodamine and metallized dyes (Formulations 1B, 2B, 3B) | | | | |
| PRR23, Abs = 0.08 | Acid Red 289 Na, Abs = 0.15 | 7.3 | 8.3 | 57 |
| PRR23, Abs = 0.08 | Acid Red 388 Na | 7.4 | 13 | 58 |
| PRR23, Abs = 0.1 | Acid Red 52 Li, Abs = 0.14 | No data | 39 | 57 |

From Table 13, one can see that rhodamine dyes are very unstable by themselves, compared to the azo-dyes. However, as can be seen in Table 14, the blends of rhodamines with pacified Reactive Red 23 are more stable to light fade than similar blends of azo dyes. This is a quite unexpected result, because one would expect that a more stable dye would also be more stable in a blend. On the other hand, the rhodamine blends are also considerably brighter, that is, provide a higher plain paper chroma than the azo dye blends. This makes rhodamine blends attractive both from the standpoint of better lightfastness and plain paper chroma.

EXAMPLE 5

Reflectance Spectra Measurements

In order to more fully illustrate the synergistic effect of the rhodamine and magenta metal dye mixtures in the inks of the present invention, the reflection spectra of the three ink formulations described in Example 1 is evaluated. Test samples are printed on white HP Premium Plus paper, at an ink flux of 15 picoliters per 300 dpi. The initial green filter optical density of the sample ink patches is about 0.7. The results of the reflectance analysis are shown in FIGS. 1 and 2.

Figure 2:
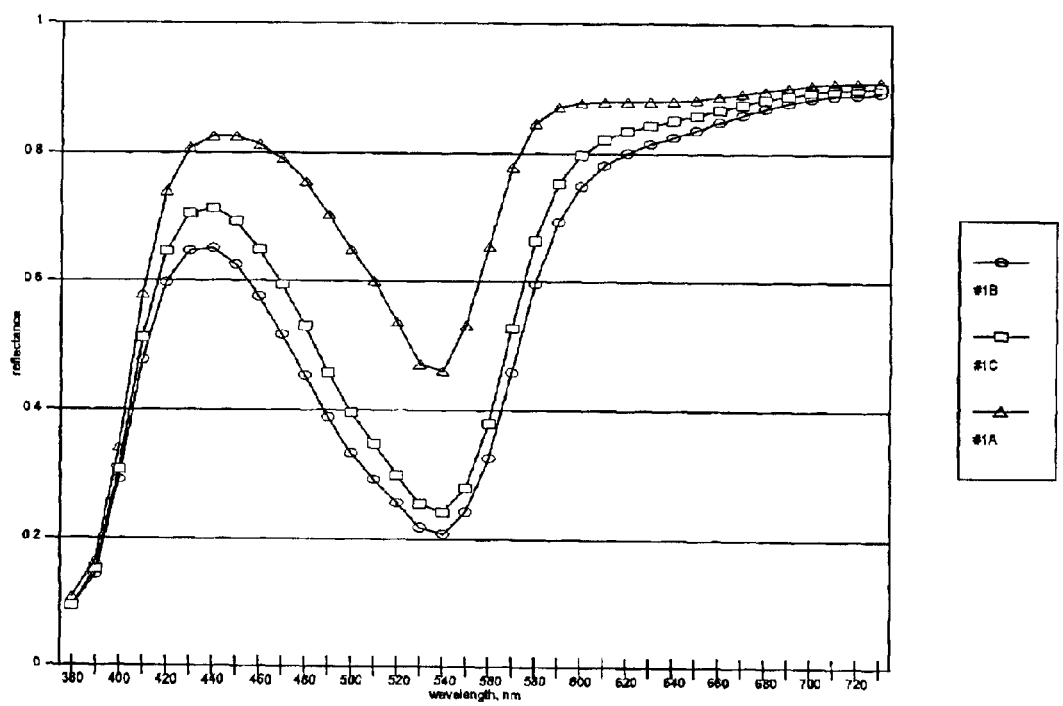
FIG. 2 is a graphical representation of the final reflectance spectra achieved by two ink formulations based on the rhodamine dye-metallized dye blend in accordance with the present invention, as compared to the ink formulation containing the rhodamine dye alone after a simulated light fade period of 5.7 years.

As can be seen, from FIG. 1, all three ink formulations have a minimum reflectance at 540 nm. At this minimum reflectance point, the initial specific reflectance values are very similar, with the #1A formulation achieving a reflectance of about 0.19, the #1B formulation achieving a reflectance of about 0.15, and the #1C formulation achieving a reflectance of about 0.16. However, as shown in FIG. 2, after 5.7 years of simulated fade, the control #1A formulation shows a substantial increase in reflectance to 0.46, (i.e. the image is becoming lighter due to fade, and reflectance has increased), while both of the dye blend inks #1B and #1C remain stable. As such, it can be seen that the dye blends contained in the inks of the present invention act synergistically, imparting a significantly improved lightfastness to the ink formulations without significantly compromising the chroma thereof.

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements. Thus, while the present invention has been shown in the drawings and fully described above with particularity and detail in connection with what is presently deemed to be the most practical and preferred embodiments of the invention, it will be apparent to those of ordinary skill in the art that numerous modifications, including, but not limited to, variations in size, materials, shape, form, function and manner of operation, assembly and use may be made, without departing from the principles and concepts of the invention as set forth in the claims.

What is claimed is:

1. An inkjet ink formulation comprising:
    a colorant in an ink vehicle, said colorant consistinc of a mixture of a rhodamine dye selected from the group consisting of: Rhodamine 110, Rhodamine 123, Basic Red 1, Rhodamine 6G extra, Rhodaniine 116, Basic Violet 10, tetrarnethylrhodamane perchlorate, Rhodamine 3B, Rhodamine 19, sulforhodamine, Acridine Red, Acid Red 52, Pyronine G, Basic Red 11, Basic Red 8, Basic Violet 11, Rhodamine 4G, Basic Red 4, Acid Red 388, sulforhodamine G, and mixtures thereof, and a metaltzed magenta dyes selected from the group consisting of Reactive Red 23 and pacified Reactive Red 23, and being present in the ink vehicle in an amount sufficient to achieve an absorbance of from about 0.03 to 0.20 at a 1:10000 dilution as measured at a peak absorbance wavelenath located between about 500 and about 600 nm.

2. The inkjet ink formulation of claim 1, wherein the rhodamine dye is Acid Red 388.

3. The inkjet ink formulation of claim 1, wherein the rhodamine dye is Acid Red 52.

4. The inkjet ink formulation of claim 1, wherein the amount of dye is sufficient to achieve an absorbance of about 0.15 at a 1:10000 dilution as measured at a peak absorbance wavelength located between about 500 and about 600 nm.

5. The inkjet ink formulation of claim 1, wherein the amount of metal ized magenta dye is sufficient to achieve an absorbance of about 0.04 at a 1:10000 dilution as measured at a peak absorbance wavelength located between about 500 and about 600 nm.

6. The inkjet ink formulation of claim 1, wherein the formulation achieves a chroma of at least about 57 on plain paper and a lightfastness of at least about 5 years on photo quality paper.

7. A method of making an inkjet ink formulation comprising the step of:
    mixing a colorant consisting of a rhodamine dye selected from the group consisting of Rhodamine 110, Rhodamine 123, Basic Red 1, Rhodamine 6G extra, Rhodamine 116, Basic Violet 10, tetramethylrhodamine perchlorate, Rhodamine 3B, Rhodamine 19, sulforhodamine, Acridine Red, Acid Red 52, Pyronine G, Basic Red 11, Basic Red 8, Basic Violet 11, Rhodamine 40, Basic Red 4, Acid Red 388, sulforhodamine G, and mixtures thereof, and a metalized magenta dye, selected from the group consisting of Reactive Red 23 and pacified Reactive Red 23, at a ratio of from about 1:10 to about 10:1 in an ink vehicle iii an amount sufficient to achieve an absorbance of from about 0.03 to about 0.20 at a 1:10000 dilution as measured at a peak absorbance wavelength located between about 500 and about 600 nm.

8. The method of claim 7, wherein the rhodamine dye is a Acid Red 388.

9. The method of claim 7, wherein the rhodainine dye is Acid Red 52.

10. The method of claim 7, wherein the amount of rhodamine dye is sufficient to achieve an absorbance of about 0.15 at a 1:10000 dilution as measured at a peak absorbance wavelength located between about 500 and about 600 nm.

11. The method of claim 7, wherein the amount of metalized magenta dye is sufficient to achieve an absorbance of about 0.04 at a 1:10000 dilution as measured at a peak absorbance wavelength located between about 500 and about 600 nm.

12. A method of making an inkjet image having a chroma of at least about 57 on plain paper and a lightfastness of at least about 5 years on HP photo quality paper comprising the steps of:
    a) providing an inkjet ink having a colorant consisting of a rhodamine dye selected from the grouo consistinu of Rhodamine 110, Rhodamine 123, Basic Red 1, Rhodamine 60 extra, Rhodamine 116, Basic Violet 10, tetramethylrhodamine perchlorate, Rhodamine 3B, Rhodamine 19, sulforhodamine, Acridine Red, Acid Red 52, Pyronine G, Basic Red 11, Basic Red 8, Basic Violet 11, Rhodamine 4G, Basic Red 4, Acid Red 388, sulforhodamine G, and mixtures thereof, and a metalized magenta dye, selected from the group consisting of Reactive Red 23 and pacified Reactive Red 23, mixed in an ink vehicle in an amount sufficient to achieve an absorbance of from about 0.03 to 0.20 at a 1:10000 dilution as measured at a peak absorbance wavelength located between about 500 and about 600 nm; and
    b) applying the inkjet ink to a print media using an inkjet pen.

13. The inkjet formulation of claim 1, wherein the amount of rhodamine dye is from about 0.1% w/w to about 5% w/w of the formulation, and the amount of metalized magenta dye is from about 0.2% w/w to about 5% w/w of the formulation.

14. The method of claim 7, wherein the amount of rhodamine dye is from about 0.1% w/w to about 5% w/w of the formulation, and the amount of metalized magenta dye is from about 0.2% w/w to about 5% w/w of the formulation.

15. The method of claim 12, wherein the amount of rhodantine dye is from about 0.1% w/w to about 5% w/w of the formulation, and the amount of metalized magenta dye is from about 0.2% w/w to about 5% w/w of the formulation.

* * * * *

UNITED STATES PATENT AND TRADEMARK OFFICE
CERTIFICATE OF CORRECTION

PATENT NO. : 6,808,555 B2
DATED : October 26, 2004
INVENTOR(S) : Wang et al.

It is certified that error appears in the above-identified patent and that said Letters Patent is hereby corrected as shown below:

Column 17,
Line 20, delete "consistinc" and insert therefor -- consisting --.
Line 23, delete "Rhodaniine" and insert therefor -- Rhodamine --.
Line 24, delete "tetrarnethylrhodamane" and insert therefor -- tetramethylrhodamine --.
Line 29, delete "metaltzed" and insert therefor -- metalized --.
Line 29, delete "dyes" and insert therefor -- dye, --.
Line 34, delete "wavelenath" and insert therefor -- wavelength --.
Line 45, delete "metal ized" and insert therefor -- metalized --.

Column 18,
Line 2, delete "40," and insert therefor -- 4G, --.
Line 5, after "Red 23," delete "at a".
Line 6, delete "ratio of from about 1:10 to about "10:1".
Line 7, delete "iii" and insert therefor -- in --.
Line 13, delete "rhodainine" and insert therefor -- rhodamine --.
Line 30, delete "grouo consistinu" and insert therefor -- group consisting --.
Line 32, delete "60" and insert therefor -- 6G --.
Line 56, delete "rhodantine" and insert therefor -- rhodamine --.

Signed and Sealed this

Fifth Day of July, 2005

JON W. DUDAS
*Director of the United States Patent and Trademark Office*